(12) United States Patent
Wu (10) Patent No.: US 9,838,945 B2
(45) Date of Patent: Dec. 5, 2017

(54) METHOD OF HANDLING LINK FAILURE AND RELATED COMMUNICATION DEVICE

(71) Applicant: HTC Corporation, Taoyuan (TW)

(72) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 11 days.

(21) Appl. No.: 14/684,426

(22) Filed: Apr. 12, 2015

(65) Prior Publication Data

US 2015/0296438 A1   Oct. 15, 2015

Related U.S. Application Data

(60) Provisional application No. 61/979,016, filed on Apr. 14, 2014.

(51) Int. Cl.
*H04W 4/22* (2009.01)
*H04W 40/14* (2009.01)
(Continued)

(52) U.S. Cl.
CPC ............ *H04W 40/14* (2013.01); *H04L 45/28* (2013.01); *H04W 74/0833* (2013.01); *H04W 76/027* (2013.01); *H04W 76/025* (2013.01)

(58) Field of Classification Search
CPC ................ H04W 24/10; H04W 36/30; H04W 36/0083; H04W 76/025; H04W 24/00; H04W 36/0094; H04W 72/0413; H04W 72/0453; H04W 72/1231; H04W 74/004; H04W 76/046; H04W 36/28
See application file for complete search history.

(56) References Cited

U.S. PATENT DOCUMENTS

2011/0286327 A1* 11/2011 Chen .................... H04W 76/028
                                                        370/225
2012/0069732 A1*  3/2012 Xu ...................... H04W 76/027
                                                        370/221
(Continued)

FOREIGN PATENT DOCUMENTS

CN    WO 2012059013 A1 * 10/2012
WO       2014019131 A1    2/2014

OTHER PUBLICATIONS

European Search report dated Aug. 31, 2015 for EP application No. 15163490.4.

(Continued)

*Primary Examiner* — Mohamed Kamara
(74) *Attorney, Agent, or Firm* — Winston Hsu (57) ABSTRACT

A communication device for handling a link failure comprises a storage unit for storing instructions and a processing means coupled to the storage unit. The processing means is configured to execute instructions stored in the storage unit. The instructions comprises communicating with a master base station via a first uplink (UL) carrier and a first downlink (DL) carrier; communicating with a secondary base station via a second UL carrier and a second DL carrier; detecting a link failure related to the secondary base station while communicating with the master base station; and transmitting information of the link failure and information of a measurement result related to the secondary base station to the master base station to report the link failure.

12 Claims, 4 Drawing Sheets

(51) Int. Cl.
*H04L 12/703* (2013.01)
*H04W 74/08* (2009.01)
*H04W 76/02* (2009.01)

(56) References Cited

U.S. PATENT DOCUMENTS

| | | | | |
|---|---|---|---|---|
| 2013/0165108 A1* | 6/2013 | Xu | ......................... | H04W 24/04 455/423 |
| 2013/0250857 A1* | 9/2013 | Lu | ......................... | H04W 24/02 370/328 |
| 2014/0023032 A1* | 1/2014 | Kim | ................... | H04W 74/0833 370/329 |
| 2014/0099942 A1* | 4/2014 | Kim | ...................... | H04W 52/44 455/424 |
| 2014/0228018 A1* | 8/2014 | Zhang | ................... | H04W 24/08 455/425 |
| 2014/0335855 A1* | 11/2014 | Lee | ...................... | H04W 24/10 455/426.1 |
| 2016/0182276 A1* | 6/2016 | Wu | ...................... | H04L 41/0654 370/225 |

OTHER PUBLICATIONS

Kyocera, "Consideration on SCG RLF", 3GPP TSG-RAN WG2 #85bis, R2-141379, Mar. 31-Apr. 4, 2014, Valencia, Spain, XP050792571, pp. 1-3.

NSN, Nokia Corporation, "SeNB Failure Reporting", 3GPP TSG-RAN WG2 Meeting#85bis, R2-141614, Mar. 31-Apr. 4, 2014, Valencia, Spain, XP050792762, pp. 1-3.

KDDI Corporation, "Discussions on reporting SCG-RLF towards MeNB", 3GPP TSG RAN WG2 Meeting#85bis, R2-141200, Mar. 31-Apr. 4, 2014, Valencia, Spain, XP050792437, pp. 1-2.

Ericsson, "Secondary Radio Link Failure (S-RLF)", 3GPP TSG-RAN WG2 #85bis, Tdoc R2-141542, Mar. 31-Apr. 4, 2014, Valencia, Spain, XP050792702, pp. 1-5.

RAN2 Chairman (Ericsson), "Proposed Agenda", 3GPP TSG RAN WG2 #85bis, Mar. 31-Apr. 4, 2014, Valencia, Spain, XP050818160, pp. 1-69, Mar. 31, 2014.

NEC, "Remaining issues in S-RLF", 3GPP TSG RAN2 Meeting#86, R2-142411, May 19-23, 2014, Seoul, South Korea, XP050818485, pp. 1-9.

3GPP TS 36.331 V12.1.0 (Mar. 2014) Technical Specification 3rd Generation Partnership Project; Technical Specification Group Radio Access Network; Evolved Universal Terrestrial Radio Access (E-UTRA); Radio Resource Control (RRC); Protocol specification (Release 12).

3GPP TSG-RAN WG2 #85bis R2-141857 Valencia, Spain, Mar. 31-Apr. 4, 2014 CR-Form-v11 Change Request.

Notice of allowance dated Jun. 13, 2017 for the Japanese Application No. 2015-081859, filing date Apr. 13, 2015, pp. 1-3.

Office action dated Aug. 18, 2017 for EP application No. 15163490. 4, pp. 1-5.

3GPP TS 36.331 V12.1.0 (Mar. 2014), "3rd Generation Partnership Project; Technical Specification Group Radio Access Network; Evolved Universal Terrestrial Radio Access (E-UTRA); Radio Resource Control (RRC); Protocol specification (Release 12)", XP050769960, pp. 1-356.

* cited by examiner

METHOD OF HANDLING LINK FAILURE AND RELATED COMMUNICATION DEVICE

CROSS REFERENCE TO RELATED APPLICATIONS

This application claims the benefit of U.S. Provisional Application No. 61/979,016, filed on Apr. 14, 2014 and incorporated herein by reference.

BACKGROUND OF THE INVENTION

1. Field of the Invention

The present invention is related to a method used in a wireless communication system, and more particularly, to a method of handling a link failure in a wireless communication system.

2. Description of the Prior Art

A long-term evolution (LTE) system supporting the 3rd Generation Partnership Project (3GPP) Rel-8 standard and/or the 3GPP Rel-9 standard are developed by the 3GPP as a successor of a universal mobile telecommunications system (UMTS), for further enhancing performance of the UMTS to satisfy increasing needs of users. The LTE system includes a new radio interface and a new radio network architecture that provides a high data rate, low latency, packet optimization, and improved system capacity and coverage. In the LTE system, a radio access network known as an evolved universal terrestrial radio access network (E-UTRAN) includes multiple evolved Node-Bs (eNBs) for communicating with multiple user equipments (UEs), and for communicating with a core network including a mobility management entity (MME), a serving gateway, etc., for Non-Access Stratum (NAS) control.

A LTE-advanced (LTE-A) system, as its name implies, is an evolution of the LTE system. The LTE-A system targets faster switching between power states, improves performance at the coverage edge of an eNB, and includes advanced techniques, such as carrier aggregation (CA), coordinated multipoint (CoMP) transmission/reception, uplink multiple-input multiple-output (UL-MIMO), etc. For a UE and an eNB to communicate with each other in the LTE-A system, the UE and the eNB must support standards developed for the LTE-A system, such as the 3GPP Rel-10 standard or later versions.

The UE may receive packets (e.g., transport blocks (TBs)) transmitted by two eNBs, when the UE is configured with a dual connectivity. Throughput of the UE is improved when the dual connectivity is operated. However, wireless links between the UE and the eNBs may not be stable due to characteristics of the wireless links. For example, a radio link failure may happen between the UE and one of the eNBs. The UE does not know how to report the radio link failure when the dual connectivity is realized by the UE and the eNBs. In another example, the UE may fail to complete a random access procedure with one of the eNBs. Similarly, the UE does not know how to process the failure of the random access procedure. In another example, the UE may fail to transmit a radio link control (RLC) packet data unit (PDU) to one of the eNBs, e.g., when the maximum number of retransmissions is reached. Communications between the UE and the eNBs may not be proceeded regularly, if the retransmission of the RLC PDU cannot be solved.

Thus, how to solve the abovementioned failures of the operations is an important topic to be discussed.

SUMMARY OF THE INVENTION

The present invention therefore provides a method for handling a link failure to solve the abovementioned problem.

A communication device for handling a link failure comprises a storage unit for storing instructions and a processing means coupled to the storage unit. The processing means is configured to execute instructions stored in the storage unit. The instructions comprises communicating with a master base station via a first uplink (UL) carrier and a first downlink (DL) carrier; communicating with a secondary base station via a second UL carrier and a second DL carrier; detecting a link failure related to the secondary base station while communicating with the master base station; and transmitting information of the link failure and information of a measurement result related to the secondary base station to the master base station to report the link failure.

A method of handling a link failure for a communication device comprises communicating with a master base station via a first uplink (UL) carrier and a first downlink (DL) carrier; communicating with a secondary base station via a second UL carrier and a second DL carrier; detecting a link failure related to the secondary base station while communicating with the master base station; and transmitting information of the link failure and information of a measurement result related to the secondary base station to the master base station to report the link failure.

A communication device for handling a link failure comprises a storage unit for storing instructions and a processing means coupled to the storage unit. The processing means is configured to execute instructions stored in the storage unit. The instructions comprises communicating with a master base station via a first uplink (UL) carrier and a first downlink (DL) carrier; communicating with a secondary base station via a second UL carrier and a second DL carrier; detecting a link failure related to the secondary base station while communicating with the master base station; and not indicating availability of information of the link failure in a message transmitted to the master base station or another master base station.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
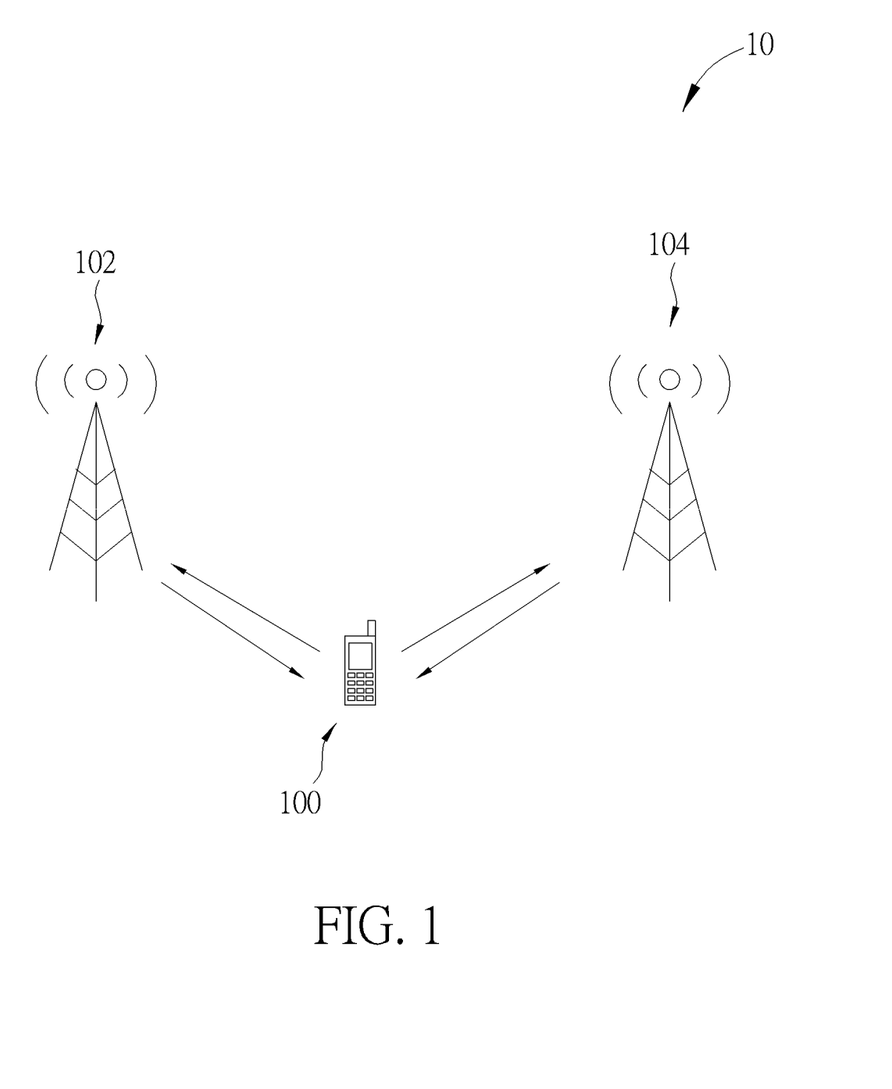
FIG. 1 is a schematic diagram of a wireless communication system according to an example of the present invention.

FIG. 1 is a schematic diagram of a wireless communication system 10 according to an example of the present invention. The wireless communication system 10 is briefly composed of a user equipment (UE) 100 and base stations (BSs) 102 and 104. In FIG. 1, the UE 100, the BSs 102 and 104 and are simply utilized for illustrating the structure of the wireless communication system 10. Practically, the BS 102 and/or the BS 104 may be an evolved NB (eNB) and/or a relay station in an evolved UTRAN (E-UTRAN), a long term evolution (LTE) system, a LTE-Advanced (LTE-A) system or an evolution of the LTE-A system. The wireless communication system 10 may be a time-division duplexing (TDD) system (i.e., the TDD mode is operated) or a frequency-division duplexing (FDD) system (i.e., the FDD mode is operated). In FIG. 1, coverage areas of the BS 102 and the BS 104 may be partly overlapped.

As shown in FIG. 1, the UE 100 may be configured to communicate with the BS 102 and the BS 104 at the same time according to a dual connectivity configured to the UE 100. That is, the UE 100 may perform a transmission/reception via both the BSs 102 and 104. For example, the UE 100 may receive packets (e.g., transport blocks (TBs)) from the BSs 102 and 104 according to the dual connectivity, or the UE 100 may transmit packets (e.g., TBs) to the BSs 102 and 104 according to the dual connectivity. In general, it means that the UE 100 receives the packets from at least one cell of the BS 102 and at least one cell of the BS 104 according to the dual connectivity, when the UE 100 receives the packets from both the BSs 102 and 104. Similarly, it means that the UE 100 transmits the packets to at least one cell of the BS 102 and/or at least one cell of the BS 104 according to the dual connectivity, when the UE 100 transmits the packets to both the BSs 102 and 104. In addition, one of the BSs 102 and 104 may be a master eNB (MeNB) and the other of the BSs 102 and 104 may be a secondary eNB (SeNB) according to the dual connectivity defined in 3GPP. One of the cell(s) of the MeNB communicating with the UE 100 may be a primary cell (PCell) and the other cell(s) (if available) of the MeNB may be secondary cell (s) (SCell(s)). One of the cell(s) of the SeNB communicating with the UE 100 may be a primary SCell (PSCell), and the other cell(s) (if available) of the SeNB may be SCell(s).

The UE 100 may be a low cost device (e.g., machine type communication (MTC) device), a device-to-device (D2D) device, a mobile phone, a laptop, a tablet computer, an electronic book, a portable computer system, or combination thereof. In addition, the UE 100, the BS 102 or the BS 104 may be seen as a transmitter or a receiver according to its transmission direction, e.g., for an uplink (UL), the UE 100 is the transmitter and the BS 102 and/or the BS 104 is the receiver, and for a downlink (DL), the BS 102 and/or the BS 104 is the transmitter and the UE 100 is the receiver.

Figure 2:
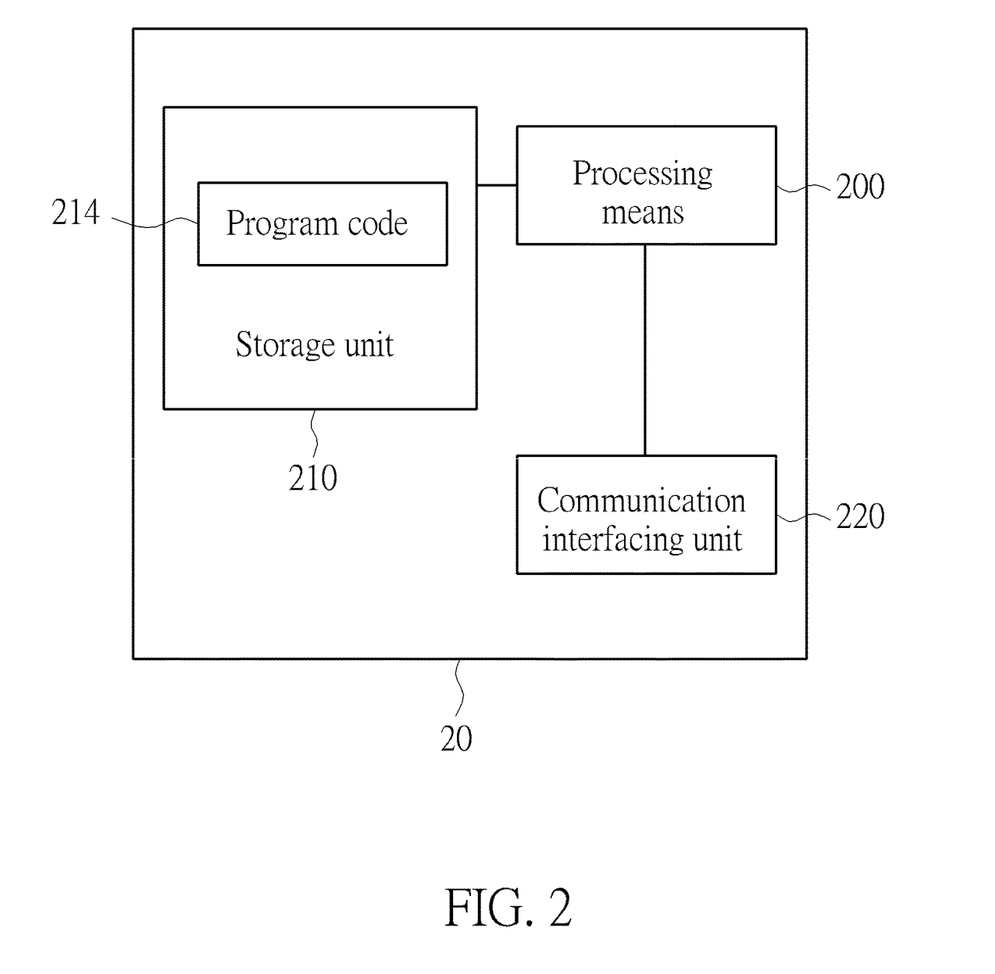
FIG. 2 is a schematic diagram of a communication device according to an example of the present invention.

FIG. 2 is a schematic diagram of a communication device 20 according to an example of the present invention. The communication device 20 may be the UE 100, the BS 102 and/or the BS 104 shown in FIG. 1, but is not limited herein. The communication device 20 may include a processing means 200 such as a microprocessor or Application Specific Integrated Circuit (ASIC), a storage unit 210 and a communication interfacing unit 220. The storage unit 210 may be any data storage device that may store a program code 214, accessed and executed by the processing means 200. Examples of the storage unit 210 include but are not limited to a subscriber identity module (SIM), read-only memory (ROM), flash memory, random-access memory (RAM), Compact Disc Read-Only Memory (CD-ROM), digital versatile disc-ROM (DVD-ROM), Blu-ray Disc-ROM (BD-ROM), magnetic tape, hard disk, optical data storage device, non-volatile storage unit, non-transitory computer-readable medium (e.g., tangible media), etc. The communication interfacing unit 220 is preferably a transceiver and is used to transmit and receive signals (e.g., data, signals, messages and/or packets) according to processing results of the processing means 200.

Figure 3:
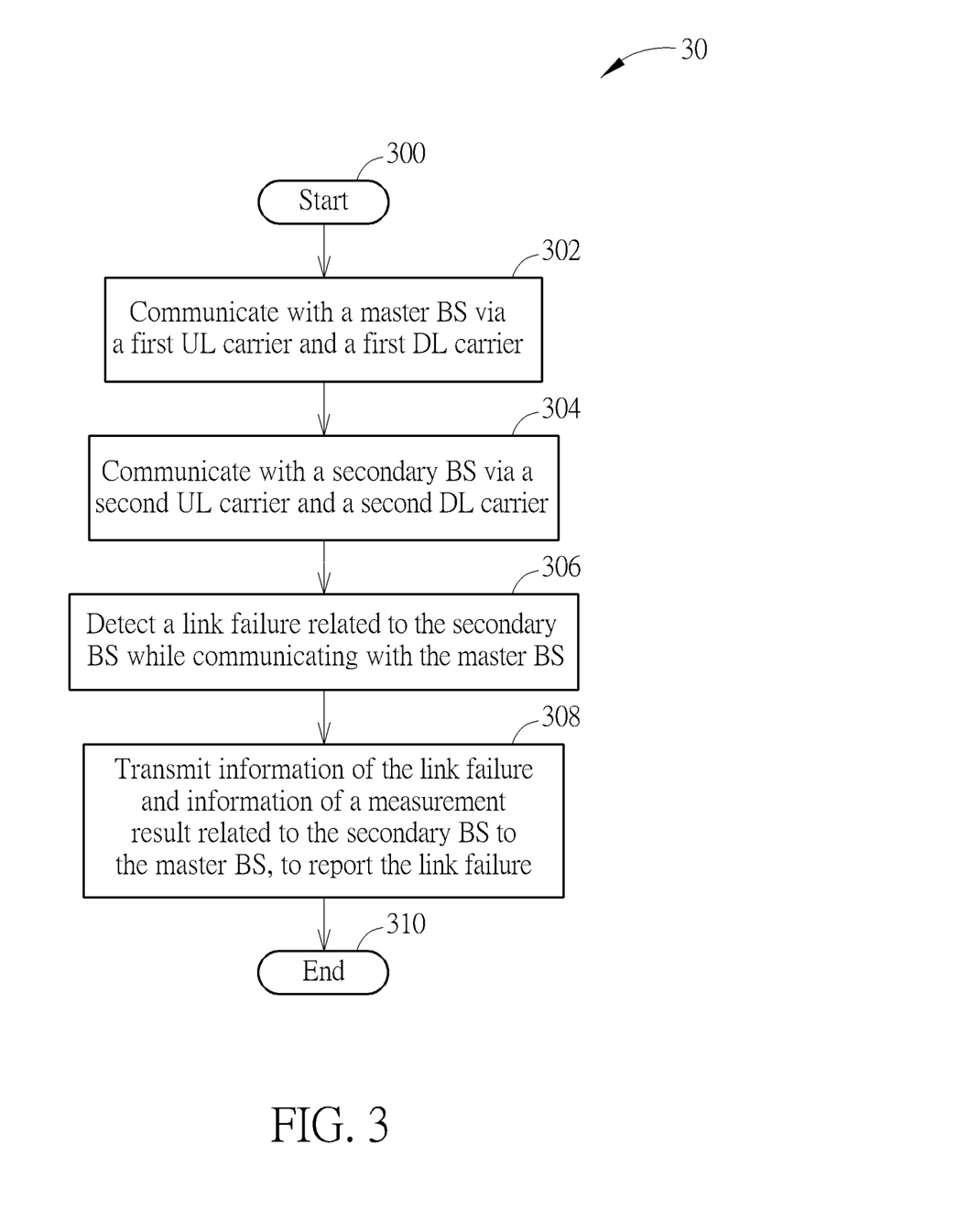
FIG. 3 is a flowchart of a process according to an example of the present invention.

FIG. 3 is a flowchart of a process 30 according to an example of the present invention. The process 30 may be utilized in a communication device (e.g., the UE 100), for handling a link failure. The process 30 may be compiled into the program code 214 and includes the following steps:

Step 300: Start.

Step 302: Communicate with a master BS via a first UL carrier and a first DL carrier.

Step 304: Communicate with a secondary BS via a second UL carrier and a second DL carrier.

Step 306: Detect a link failure related to the secondary BS while communicating with the master BS.

Step 308: Transmit information of the link failure and information of a measurement result related to the secondary BS to the master BS, to report the link failure.

Step 310: End.

According to the process 30, the communication device communicates with a master BS (e.g., the BS 102) via a first UL carrier and a first DL carrier, and communicates with a secondary BS (e.g., the BS 104) via a second UL carrier and a second DL carrier. The communication device may detect a link failure (e.g., radio link failure) related to the secondary BS (e.g., occurred between the communication device and the secondary BS) while communicating with the master BS. Then, the communication device transmits information of the link failure and information of a measurement result related to the secondary BS to the master BS, to report the link failure. That is, the communication device provides the information of the link failure (e.g., for indicating the link failure) and the information of the measurement result (e.g., for handling the link failure) to the master BS, to report the link failure. Thus, the master BS can handle the link failure according to the information of the measurement result, after receiving the reporting of the link failure.

The master BS may handle the link failure in several ways according to the information of the measurement result to avoid the link failure happens again. In the first example, the master BS may reconfigure the UE to release the second UL carrier and the second DL carrier if the measurement result shows that qualities of these carriers are not good. In the second example, the master BS may reconfigure the UE to replace the second UL carrier and the second DL carrier with a third UL carrier and a third DL carrier respectively if the measurement result shows that quality of the third DL carrier is good. In the third example, the master BS may still reconfigure the UE to use the second UL carrier and the second DL carrier if the measurement result shows that quality of the second DL carrier is still good. The master BS may determine that a DL carrier is good if a measurement value of the DL carrier in the measurement result is greater than a predetermined value.

The first UL carrier and the first DL carrier may be component carriers belonging to a cell of the master BS. The second UL carrier and the second DL carrier may be component carriers belonging to a cell of the secondary BS. In one example, the master BS may be a master eNB (MeNB), and the secondary BS may be a secondary eNB (SeNB). The cell of the MeNB may be a PCell and the cell of the SeNB may be a PSCell. There may be a radio resource control (RRC) connection between the communication device and the MeNB, and the communication device may be configured to communicate with the MeNB and the SeNB, i.e., dual connectivity.

Moreover, the information of the link failure may be included in a first message and the information of the measurement result may be included in a second message. The first message and the second message may be RRC messages. The communication device may transmit the RRC messages via a RRC connection to the MeNB. Alternatively, the information of the link failure and the information of the measurement result may be in a single message. The single message may be a Secondary Cell Group Failure Information (SCGFailureInformation) message. The communication device may transmit the single message via the RRC connection to the MeNB. The RRC connection may consist of at least one signaling radio bearer (SRB) and is established before the link failure.

Realization of the present invention is not limited to the above description.

In one example, the communication device may transmit the first message including the information of the link failure to the master BS, after detecting the link failure. Then, the master BS transmits a request message to the communication device in response to the information of the link failure. The communication device transmits the information of the measurement result to the master BS in response to the request message. The request message may also be a RRC message, e.g., UEInformationRequest. In short, the communication device transmits the second message to the master BS according to the request message. That is, the communication device only indicates the link failure to the master BS at the beginning. The communication device provides the information of the measurement result to the master BS, if the request message from the master BS is received. The first message may further include availability of the information of the measurement result to notify the master BS or another master BS to retrieve the information of the measurement result by using the request message.

The link failure in the process 30 is not limited. There are various types of the link failure. In one example, the link failure may include a radio link failure on the second DL carrier of a cell, e.g., PSCell, due to expiry of a timer of the communication device. In one example, the communication device may perform a random access procedure on the second UL carrier of the cell to the secondary BS when communicating with the secondary BS, and the link failure may include a random access problem related to the random access procedure on the second UL carrier. In one example, the link failure may include a radio link control (RLC) problem where the maximum number of retransmissions on the second UL carrier is reached. The information of the link failure may indicate a failure type of the link failure as described above. In other words, the information of the link failure may indicate that the radio link failure on the second DL carrier, the random access problem on the second UL carrier or the RLC problem on the second UL carrier detected by the communication device. In addition, the information of the link failure may or may not further include a Cell Radio Network Temporary Identifier (C-RNTI) assigned by the secondary BS.

Detail of the information of the measurement result in the process 30 is not limited. In one example, the information of the measurement result may include measurement value (s) based on measurement (s) on DL signal (s) of the at least one cell of the secondary BS. The measurement value (s) may include at least one of a Reference Signal Received Power (RSRP) and a Reference Signal Received Quality (RSRQ) of at least one cell of the secondary BS. Further, if the secondary BS is a SeNB, the at least one cell may include one or more SCells, wherein one of the SCell (s) may be a PSCell.

Details of the information of the link failure and the information of the measurement result in the process 30 are not limited. For example, the information of the measurement result may include at least one of global cell identity, physical cell identity and carrier frequency of each of the at least one cell to identify the at least one cell of the secondary BS to which the measurement result(s) correspond. The information of the measurement result may further include location information of the communication device. For example, the location information may include location coordinates and/or a horizontal velocity of the communication device.

Figure 4:
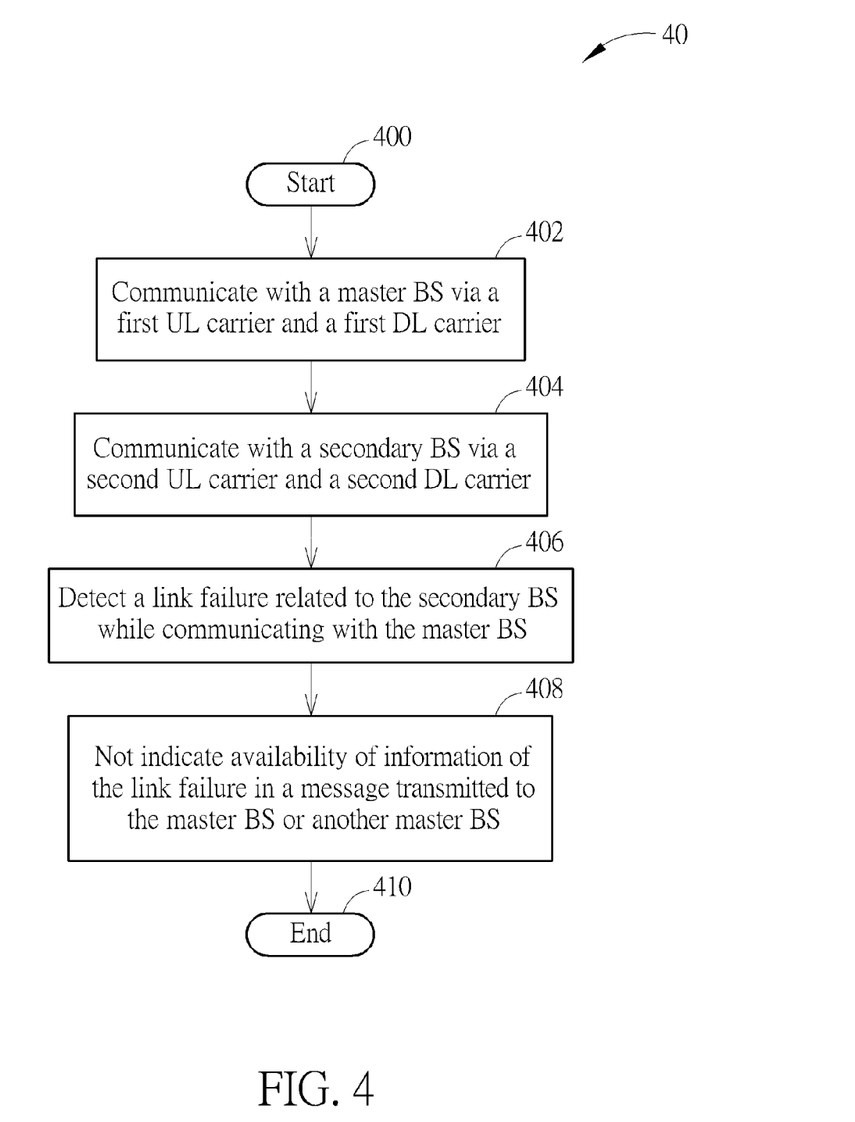
FIG. 4 is a flowchart of a process according to an example of the present invention.

FIG. 4 is a flowchart of a process 40 according to an example of the present invention. The process 40 may be utilized in a communication device (e.g., the UE 100), for handling a link failure. The process 40 may be compiled into the program code 214 and includes the following steps:

Step 400: Start.

Step 402: Communicate with a master BS via a first UL carrier and a first DL carrier.

Step 404: Communicate with a secondary BS via a second UL carrier and a second DL carrier.

Step 406: Detect a link failure related to the secondary BS while communicating with the master BS.

Step 408: Not indicate availability of information of the link failure in a message transmitted to the master BS or another master BS.

Step 410: End.

According to the process 40, the communication device communicates with a master BS (e.g., the BS 102) via a first UL carrier and a first DL carrier, and communicates with a secondary BS (e.g., the BS 104) via a second UL carrier and a second DL carrier. The communication device may detect a link failure (e.g., radio link failure) related to the secondary BS, e.g., occurred between the communication device and the secondary BS, while communicating with the master BS. Then, the communication device does not indicate availability of information of the link failure in a message transmitted to the master BS or another master BS. That is, the communication device does not notify the availability of the link failure related to the secondary BS to the master BS or another master BS. Thus, the master BS or the other master BS does not transmit a request message for requesting the communication device to transmit a response message including the information of the link failure. The problem that the master BS or the other BS may obtain the information of the link failure incorrectly is avoided, because the communication device does not notify the availability of the information of the link failure related to the secondary BS. Moreover, another problem is that it will be a duplicate reporting of the information of the link failure if the communication device transmits the information of the link failure according to process 30, and the communication device transmits the information of the link failure to the master BS again due to that the master BS transmits the request message in response to the availability of the information of the link failure. The other problem is also avoided.

In one example, the availability of the information of the link failure may include rlf-Info-Available, and the message may be a RRCConnectionReconfigurationComplete message, a RRCConnectionReestablishmentComplete message or a RRCConnectionSetupComplete message. The master BS may be a MeNB and the secondary BS may be a SeNB. The first UL carrier and the first DL carrier may be component carriers of a PCell of the MeNB. The second UL carrier and the second DL carrier may be component carriers of a PSCell of the SeNB. The request message may be a UEInformationRequest message, and the response message may be a UEInformationResponse message. That is, the communication device does not include the rlf-Info-Available in the RRCConnectionReconfigurationComplete message and/or the RRCConnectionSetupComplete message transmitted to the MeNB, when the link failure is related to the SeNB. Thus, the MeNB or the other MeNB does not transmit the UEInformationRequest message to the communication device.

Realization of the present invention is not limited to the above description.

The link failure in the process 40 is not limited. There are various types of the link failure. In one example, the link failure may include a radio link failure on the second DL carrier of a cell, e.g., PSCell, due to expiry of a timer of the communication device. In one example, the communication device may perform a random access procedure on the second UL carrier of the cell to the secondary BS when communicating with the secondary BS, and the link failure may include a random access problem related to the random access procedure on the second UL carrier. In one example, the link failure may include a RLC problem where the maximum number of retransmissions on the second UL carrier is reached. The information of the link failure may indicate a failure type of the link failure as described above. In other words, the information of the link failure may indicate that the radio link failure on the second DL carrier, the random access problem on the second UL carrier or the RLC problem on the second UL carrier detected by the communication device. In addition, the information of the link failure may or may not further include a C-RNTI assigned by the secondary BS.

Detail of the information of the link failure which is not transmitted in the process 40 is not limited. In one example, the information of the link failure may relate to at least one cell of the secondary BS. For example, if the secondary BS is a SeNB, the at least one cell may include one or more SCells, wherein one of the SCell(s) may be a PSCell. The information of the link failure may include at least one of a global cell identity, a physical cell identity and a carrier frequency of each of the at least one cell.

Furthermore, the communication device may detect another link failure related to the master BS (e.g., occurred between the communication device and the master BS), and indicate availability of information of the other link failure to the master BS or another master BS. That is, the communication device notifies availability of the information of the link failure related to the master BS to the master BS or the other master BS, but does not notify availability of a link failure related to the secondary BS to the master BS or the other master BS. For example, while communicating with a SeNB, the communication device may detect a radio link failure on the first DL carrier of a cell of a MeNB, a random access problem when performing a random access procedure on the first UL carrier of the cell of the MeNB to the MeNB or a RLC problem when transmitting a RLC PDU on the first UL carrier of the cell of the MeNB to the MeNB. The communication device may perform a RRC connection reestablishment procedure by transmitting a RRCConnectionReestabishmentRequest message to the MeNB or another MeNB. The communication device may include rlf-Info-Available in a RRCConnectionReestablishmentComplete message of the RRC connection reestablishment procedure. Moreover, after performing the RRC connection reestablishment procedure, the communication device may include the rlf-Info-Available in a RRCConnectionReconfigurationComplete message responding to a RRCConnectionReconfiguration message received from the MeNB or another MeNB, if the communication device has not transmitted the information of the link failure to the MeNB or the other MeNB. After performing the RRC connection reestablishment procedure, the communication device may include the rlf-Info-Available in a RRCConnectionSetupComplete message responding to a RRCConnectionSetup message received from the MeNB or another MeNB, if the communication device has not transmitted the information of the link failure to the MeNB or the other MeNB.

A carrier (UL carrier or DL carrier) mentioned above may be a FDD carrier for the FDD mode or a TDD carrier for the TDD mode. The FDD carrier may include subframes with the same transmission direction (e.g., UL or DL). The TDD carrier may include subframes with different transmission directions, and the transmission directions of the subframes are determined according to a UL/DL configuration of the TDD carrier.

Those skilled in the art should readily make combinations, modifications and/or alterations on the abovementioned description and examples. The abovementioned steps of the processes including suggested steps can be realized by means that could be a hardware, a firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include a system on chip (SOC), system in package (SIP), a computer on module (COM), and the communication device 20. Process 30 and process 40 may be combined together to solve the problems as described above.

To sum up, the present invention provides a method of handling a link failure. The communication device transmits information of the link failure to a BS according to the present invention, such that the BS can handle the link failure properly and incorrect processing of the information is avoided. Thus, the operation of the communication device and the BS is performed regularly.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device for handling a link failure, comprising:
   a storage unit for storing instructions of:
   communicating with a master base station via a first uplink (UL) carrier and a first downlink (DL) carrier;
   communicating with a secondary base station via a second UL carrier and a second DL carrier;
   detecting a link failure related to the secondary base station while communicating with the master base station; and
   transmitting information of the link failure and information of a measurement result related to the secondary base station in a Secondary Cell Group Failure Information (SCGFailureInformation) message to the master base station to report the link failure;
   not indicating availability of information of the link failure related to the secondary base station in a RRC- ConnectionReconfigurationComplete message, a RRC-ConnectionReestablishmentComplete message or a RRCConnectionSetupComplete message transmitted to the master base station or another master base station; and a processing means, coupled to the storage unit, configured to execute the instructions stored in the storage unit.

2. The communication device of claim 1, wherein the information of the link failure and the information of the measurement result are in a single message.

3. The communication device of claim 1, wherein the information of the link failure indicates a radio link problem on the second DL carrier, a random access problem on the second UL carrier or a radio link control (RLC) problem on the second UL carrier detected by the communication device.

4. The communication device of claim 1, wherein the information of the measurement result comprises at least one of a Reference Signal Received Power (RSRP) and a Reference Signal Received Quality (RSRQ) related to the secondary base station.

5. The communication device of claim 1, wherein the information of the measurement result is related to at least one cell of the secondary base station.

6. The communication device of claim 5, wherein the information of the measurement result further comprises at least one of at least one global cell identity, at least one physical cell identity and at least one carrier frequency of the at least one cell.

7. A method of handling a link failure for a communication device, the method comprising:

communicating with a master base station via a first uplink (UL) carrier and a first downlink (DL) carrier;

communicating with a secondary base station via a second UL carrier and a second DL carrier;

detecting a link failure related to the secondary base station while communicating with the master base station;

transmitting information of the link failure related to the secondary base station and information of a measurement result related to the secondary base station in a Secondary Cell Group Failure Information (SCGFailureInformation) message to the master base station to report the link failure; and not indicating availability of information of the link failure related to the secondary base station in a RRC-ConnectionReconfigurationComplete message, a RRC-ConnectionReestablishmentComplete message or a RRCConnectionSetupComplete message transmitted to the master base station or another master base station.

8. The method of claim 7, wherein the information of the link failure and the information of the measurement result are in a single message.

9. The method of claim 7, wherein the information of the link failure indicates a radio link problem on the second DL carrier, a random access problem on the second carrier or a radio link control (RLC) problem on the second UL carrier detected by the communication device.

10. The method of claim 7, wherein the information of the measurement result comprises at least one of a Reference Signal Received Power (RSRP) and a Reference Signal Received Quality (RSRQ) related to the secondary base station.

11. The method of claim 7, wherein the information of the measurement result is related to at least one cell of the secondary base station.

12. The method of claim 11, wherein the information of the measurement result further comprises at least one of at least one global cell identity, at least one physical cell identity and at least one carrier frequency of the at least one cell.

* * * * *